Aug. 4, 1970     O. M. SMALL     3,523,013
CYSTALLINE GLASS CONTAINER WITH A CERMET COAT AND A METAL COAT
Original Filed Dec. 15, 1964     3 Sheets-Sheet 1
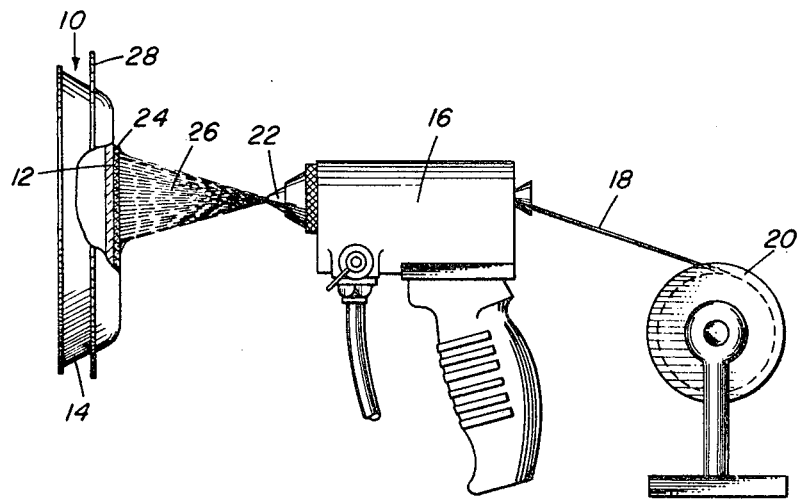
FIG-1
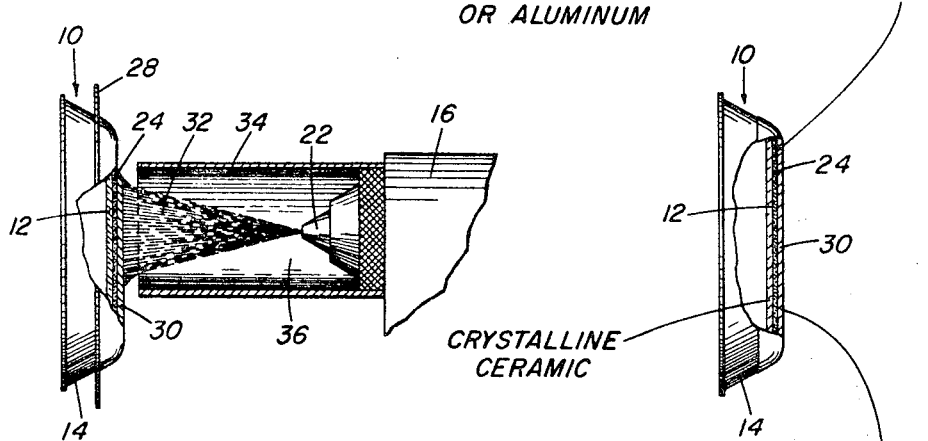
FIG-2
FIG-3
INVENTOR.
OWEN M. SMALL
BY W. A. SCHAICH &
CLARON N. WHITE
ATTORNEYS United States Patent Office 3,523,013
Patented Aug. 4, 1970

3,523,013
CRYSTALLINE GLASS CONTAINER WITH A CERMET COAT AND A METAL COAT
Owen M. Small, Toledo, Ohio, assignor to Owens-Illinois, Inc., a corporation of Ohio
Continuation of application Ser. No. 418,393, Dec. 15, 1964. This application Nov. 22, 1968, Ser. No. 778,922
Int. Cl. B32b 15/00
U.S. Cl. 29—195
8 Claims

ABSTRACT OF THE DISCLOSURE

Crystalline ceramic articles especially useful as top-of-the-stove cooking receptacles are modified to improve their thermal conductivity by applying particular coating treatments to the surface of the receptacle that is brought into contact with a direct source of heat. A first coating is a layer comprised of sprayed, molten, thermally conductive, oxygen-containing metallic material, e.g., an oxygen-containing copper or aluminum substance.

---

The first coating can be applied by spraying, in an oxidizing atmosphere, molten thermally conductive metallic material, e.g., copper, against the surface to be coated. Before spraying, the crystalline ceramic article to be coated is heated (if not already at the application temperature), e.g., to 1200°–1600° F. Instead of this procedure which requires the presence of an oxidizing gas, a spray gun or other device adapted to handle a mixture of finely divided metal, e.g., copper, and finely divided metal oxide, e.g., copper oxide, may be employed.

This first coating may be burnished or polished; coated with ceramic colors; treated with impregnants or effect agents; or monograms, designs, code number or other indicia may be etched or otherwise formed therein.

The first layer functions as a base or substrate for the application of one or more other layers. Such subsequent layer(s) are thermally conductive, oxygen-free metallic material, e.g., copper or aluminum. The second layer or layers can be applied by dip-coating, electrolytic deposition or, preferably, by spray deposition in a non-oxidizing atmosphere.

FIGS. 4 and 5 of an accompanying drawing illustrate the temperature profiles or gradients of plain-bottom, crystalline ceramic cookware, after heating at medium heat for 2 minutes and 5 minutes, respectively; while FIGS. 6 and 7 illustrate temperature gradients of aluminum-coated bottom, crystalline ceramic cookware after applying the same heat input for the same time periods.

This invention relates broadly to composite articles and to a method of manufacturing the same. More particularly it relates to composite articles comprising a combination of (a) a "crystalline" (i.e., at least partly crystalline or semicrystalline) ceramic material or structure and (b) a thermally conductive layer or layers in contact with the element of (a); and to a method of producing articles comprising the desired combination.

In recent years the use of ceramics including shaped ceramic bodies or articles that are made by the controlled crystallization of glass bodies by heat treatment has come into extensive use for certain purposes, particularly where overall strength and resistance to heat are desired. However, the use of such crystalline ceramics (also known as "glass-ceramics") for cooking ware that is to be used in direct contact with burner elements has been found to have a serious disadvantage due to the poor thermal conductivity of the crystalline ceramic and resulting lessened resistance to thermal shock. Consequently, food placed in a crystalline ceramic (glass-ceramic) cooking vessel, which is in direct contact with a burner element or flame, ordinarily will be burned if it is immediately above the burner element; and food which is only a short distance away, but not directly over a burner flame, will remain substantially uncooked.

The same problem has been encountered in a similar use of other cooking ware such as enameled metallic cooking vessels made from aluminum, iron and steel; stainless steel; and glass. As a proposed solution to the problem the prior art (see, for example, U.S. Pat. No. 2,511,404 dated June 13, 1950) discloses the spraying of a copper layer on the roughened bottom and side walls of such cooking vessels. However, the prior art does not disclose the application of such a layer to a crystalline ceramic body constituting one element of the combination present in the composite articles of this invention; or to a non-roughened surface of such a ceramic. Furthermore, the prior art does not teach the application of at least one initial layer of globules of molten thermally conductive oxygen-containing metallic material to a crystalline ceramic body or, for that matter, to any other glass or ceramic substrate.

It is also suggested in the prior art that a shaped "glass (or ceramic)" article have a portion of its surface coated with one or more layers of the same or different metals (more particularly aluminum, zinc or alloys of metals, specifically brass) sprayed thereon while the article is still hot from the shaping thereof (see, for example, U.S. Pat. No. 2,053,923, dated Sept. 18, 1936). Such prior art not only fails completely as a solution to the problem with which the present applicant was confronted for the reasons set forth in the preceding paragraph, but actually teaches away from the applicant's solution to his particular problem. This is because the last-mentioned prior-art patent teaches that the problem can be solved only by spraying the article with metal only while it is still hot from the shaping operation when the metal coating is applied.

In view of the aforementioned limitations relating to the use of crystalline ceramic articles for top-of-the-stove ware, which limitations have been characteristic of other such cooking receptacles, it is a primary object of this invention to provide crystalline ceramic ware which has been subsequently modified to improve its thermal conductivity.

It is a further object of this invention to provide a method for the manufacture of the aforesaid crystalline ceramic ware.

Still another object of the invention is to provide crystalline ceramic ware which is suitable for use in direct contact with a source of heat of varying intensity.

Other objects and advantages of the invention will be apparent to those skilled in the art from the following more detailed description and the accompanying drawing illustrating the invention.

The novel features that are characteristic of my invention are set forth in the appended claims. The invention itself, however, will best be understood as the description of the invention proceeds with reference to the accompanying drawing in which:

FIG. 1 is a somewhat schematic view, partly in section, illustrating the application of an initial or first coating of sprayed, molten, thermally conductive, oxygen-containing metallic material to the bottom surface of a shaped, crystalline, ceramic container and wherein the thickness of the applied coating and the coverage of the sprayed material on a single pass have been exaggerated;

FIG. 2 is also a somewhat schematic view of a modified portion of the apparatus shown in FIG. 1, and of the crystalline ceramic container after being first coated as in FIG. 1, and which illustrates the application of a second coating of sprayed, molten, thermally conductive, substantially oxygen-free, metallic material that adheres to the first coating;

FIG. 3 is a view, partly in section, of the shaped, crystalline, ceramic container after it has received its second coating as illustrated in FIG. 2;

Figure 4:
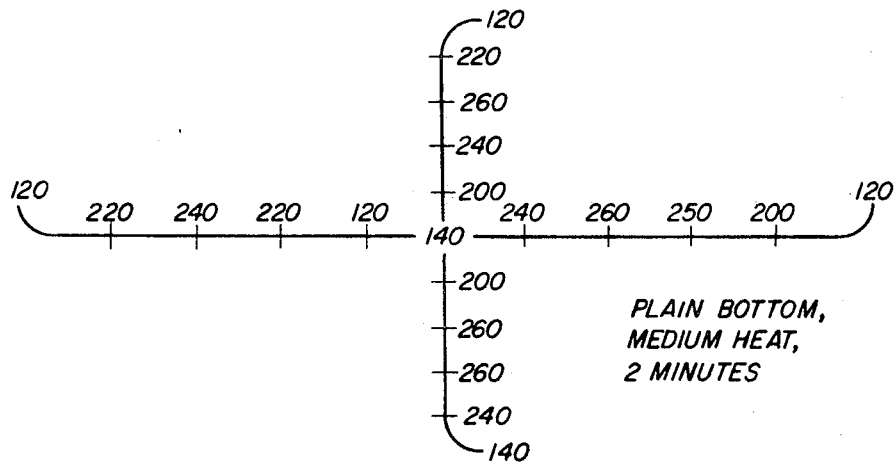
Figure 5:
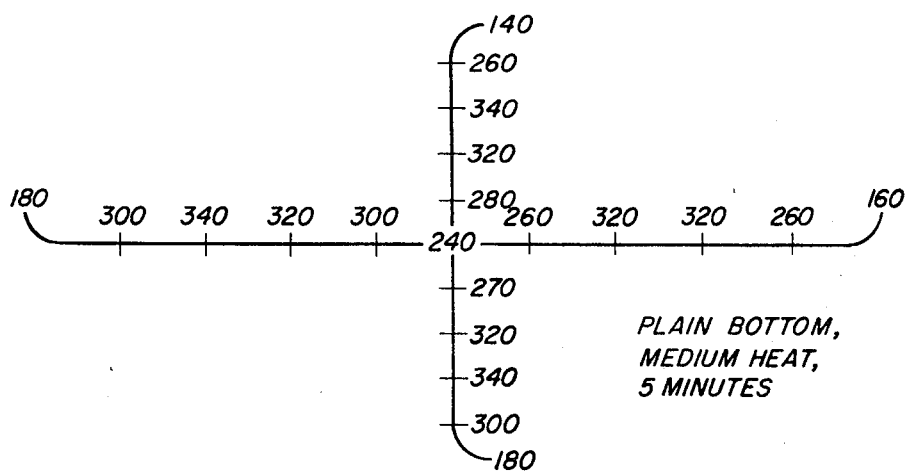
Figure 6:
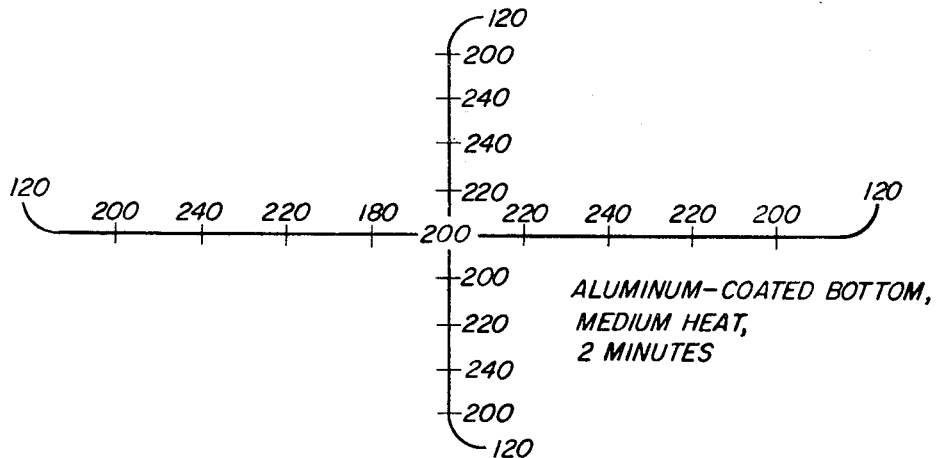
Figure 7:
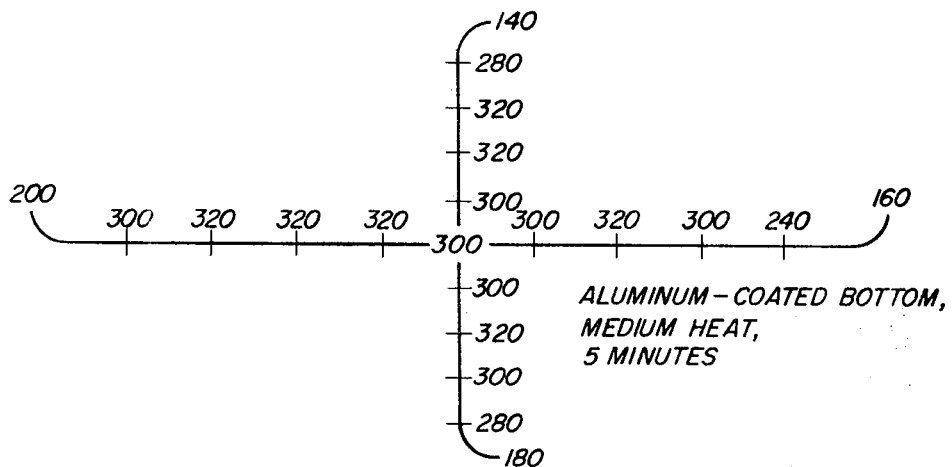

FIGS. 4 and 5 illustrate the temperature profiles or gradients of plain-bottom, crystalline ceramic cookware after heating, at medium heat, for 2 minutes and 5 minutes, respectively; and FIGS. 6 and 7 illustrate the temperature profiles or gradients of aluminum-coated bottom, crystalline ceramic cookware after heating at medium heat, for 2 minutes and 5 minutes, respectively.

In accordance with the present invention the thermal conductivity characteristics of a shaped crystalline ceramic container having bottom and side walls are improved by applying to surfaces, e.g., the bottom and part of the side surfaces, of said container, in the presence of an oxygen-containing gas, a coating comprising globules of molten thermally conductive oxygen-containing metallic material whereby the said molten metallic material adheres to the surfaces of the aforesaid shaped crystalline ceramic container to which it has been applied. In all cases the shaped ceramic container which is coated as above described has been removed from the mold in which it was shaped, and passed through annealing- and other heat-treatments prior to the application of the said globules of molten oxygen-containing metallic material. In other words, contrary to the teachings of the prior art, the shaped crystalline ceramic container is not sprayed with metal while it is still hot from the shaping operation when the metal coating is applied.

To determine whether or not oxygen dissolved in (and/or otherwise combined with) the aforementioned thermally conductive metal, specifically copper, was necessary to promote adherence of sprayed copper coatings on crystalline ceramic cookware, the following tests were conducted:

(A) A specimen of crystalline ceramic material was sprayed with copper in an oxidizing atmosphere, specifically in air, then was heated to 1150° C. in an argon atmosphere, and was held at this temperature for 5 minutes.

(B) Some oxygen-free copper was deposited on the same kind of crystalline ceramic material used in (A), and was heated to 1150° C. in an argon atmosphere for 5 minutes as in (A).

(C) A compacted powder mixture of oxygen-free copper and 5 weight percent of $Cu_2O$ admixed therewith was placed on the same kind of crystalline ceramic material used in (A), and then was heated to 1150° C. in an argon atmosphere and held at that temperature for 5 minutes as in (A).

The results of the foregoing tests may be described briefly as follows:

(A) The sprayed copper melted and formed droplets or globules on the surface. Cuprous oxide (from the sprayed copper) appeared on the copper surface. The adherence of these droplets was such that an attempt to dislodge them resulted in failure in the crystalline ceramic material rather than at the interface between the copper and the crystalline ceramic material.

(B) The oxygen-free copper melted and formed a droplet on the crystalline ceramic material but adherence was non-existent. The crystalline ceramic material showed no evidence of having interacted with the molten copper.

(C) The mixture of copper and copper oxide melted and flowed around the crystalline ceramic material, resulting in strong adherence to the ceramic surface. In this test, as in (A), fracture seemed to occur in the crystalline ceramic material rather than at the interface between the copper and the said ceramic material.

Visual examination indicated that a contact angle of less than 90° was exhibited by the sprayed copper droplets on the crystalline ceramic, while the oxygen-free copper showed a contact angle much larger than 90°. The effect of dissolved oxygen on the surface tension of liquid copper is unknown, but it is believed that it lowers the copper surface tension. In this connection it may also be mentioned that, since the contact angle drops from greater than 90° to less than 90°, a reduction in liquid-solid interfacial energy is indicated.

The work of adhesion of liquid to solid is given by, $$W_{SL} = \frac{G}{LG}(1+\cos\theta)$$

where $\frac{G}{LG}$ is the copper surface tension, and $\theta$ is the contact angle. Thus, a change in contact angle from greater than 90° to less than 90° gives a large increase in work of adhesion.

Support for the foregoing theoretical considerations is found in the actual behavior of the system. Thus, oxygen-free metallic copper showed no adherence to the test specimen of crystalline ceramic while copper that had been melted and sprayed in an oxidizing atmosphere upon the crystalline ceramic, the thusly sprayed copper being oxygen-saturated, exhibited very strong adherence to the ceramic substrate.

The above-described oxygen-containing coating may be applied to the crystalline ceramic thick enough (e.g., from about 10 to about 20 mils thick) so that the coated area may be ground smooth; or, depending upon the particular metal employed, the coating may be applied only thick enough (e.g., from about 5 to about 20 mils thick) so that the metal may be activated and the metallic coating increased in thickness by other suitable means, e.g., by electroplating an electroplatable metal over the first coating; by dipping in molten metal; or preferably as hereafter more fully described with reference to FIGS. 2 and 3 of the accompanying drawing.

Referring to the drawing and more particularly to FIG. 1 thereof, there is shown by way of illustration a cooking vessel or container 10, which may be, for example, a frying pan, sauce pan, or other top-of-the-stove cookware, having a bottom wall 12 and a contiguous side wall 14. The vessel 10 is a shaped, crystalline ceramic article that has been removed from the mold in which it was shaped and passed through annealing- and other heat-treatments prior to its use in making the composite articles of this invention.

As shown in FIG. 1 the vessel 10 is being coated by means of a spray gun 16 into which a metal, specifically a metal wire 18, is fed from a supply source 20. Any suitable spray gun (often designated as "flame spray" gun) may be used among which may be mentioned those described in, for instance, U.S. Pats. 3,055,591 and 3,148,818. In such devices the metal in the form of a powder or a "wire" (within which term is included rod) is fed by suitable feed means into a heating zone which is produced by the combustion of a combustible gas (e.g., propane or acetylene) and a combustion-supporting gas. Preferably the spray gun is one to which the metal is fed in the form of a wire. In such a device a suitable gaseous blast is supplied to and directed through nozzle 22 of the gun whereby the wire is melted and molten particles or globules thereof are blown upon the surface 12 to produce the coating 24.

The spray 26 of molten thermally conductive metallic material is applied (in one or more passes as desired or as may be required) to the surface 12 in an oxidizing atmosphere, i.e., in the presence of an oxygen-containing gas such as air, oxygen or their obvious equivalents. Hence, the coating 24 both initially and after cooling to solid state is constituted of thermally conductive oxygen-containing metallic material that adheres tenaciously to the crystalline ceramic substrate to which it has been applied.

Before applying the spray 26 to the bottom 12 of the vessel 10, the latter is heated to a suitable temperature (if not already at such temperature), e.g., a temperature within the range of from about 1200° F. to about 1600° F. Also, before applying the spray 26, the vessel 10 is preferably provided with the shield 28 which prevents the deposition of globules of metal upon portions of the vessel 10 that it is not desired to coat. Such a shield or mask may conveniently take the form of a spun serrated aluminum mask that can be fitted snugly around the vessel 10 at the desired point. A suitable release agent, e.g., a silicone release agent, advantageously may be applied to the surface of the mask that is to be exposed to the metal spray, in order to cause spalling of sprayed metal from the mask. Instead of using an aluminum mask, one may use a similar or equivalent mask or shield formed of any other suitable non-combustible material, e.g. stainless steel.

The use of a shield or mask during the spraying operation prevents flow of the molten sprayed metal past the point where it is fitted about the vessel 10, and provides a smooth, unbroken edge of deposited metal.

It may here be pointed out that in practicing this invention it is not necessary to roughen the surface of the crystalline ceramic upon which the molten metal is sprayed. The bottom 12 and adjacent area are normally smooth and substantially non-porous, and the sprayed metal may be applied directly thereto.

Any suitable thermally conductive metal, and preferably one that is also ductile, may be employed among which may be mentioned, for example, copper, aluminum, and alloys of such metals either with each other and/or with one or more other metals such as zinc, magnesium, tin, nickel, manganese and, where cost is unimportant, gold and/or silver. More specific examples of such alloys will be found in, for instance, the "Handbook of Chemistry and Physics," 44th Edition, 1962–1963, pp. 1527–1537, published by The Chemical Rubber Publishing Company, Cleveland, Ohio. Other useful alloys include those commercially available under the tradenames of Y brass, S. F. aluminum, which latter is available from Metallizing Engineering Company, Inc., Rahway, N.J., and an isoelastic copper and nickel alloy that is commercially available as Elinvar alloy.

As will be apparent to those skilled in the art from the foregoing description, means may be employed to deposit a thermally conductive oxygen-containing metallic material upon surfaces of a crystalline ceramic other than to spray molten oxidizable metal in the presence of an oxidizing gas upon the said surfaces, and whereby (when the molten metal is copper) copper oxide (presumably a mixture of $Cu_2O$ and $CuO$) is formed in situ. For example, instead of feeding a wire of metallic copper to the flame spray gun one may employ a gun adapted to handle a mixture of finely divided copper and finely divided copper oxide in any suitable proportions (e.g., from 10:90 to 90:10 parts by weight), which mixture is fed to the gun. Or, the mixture may be pelleted and the pellets fed to a spray gun; or the mixture may be bonded together with a suitable adhesive which is then extruded in wire or rod form, and fed in such extruded form to a suitable spray gun. When any such technique is employed, the aforementioned oxidizing gas becomes unnecessary in order to saturate the molten metal with oxygen. However, in practicing this technique the use of an oxidizing gas is not precluded, since one may still want to employ such a gas, e.g., air or oxygen, in order to support combustion and maintain a flame.

After the coating 24 has been applied to the bottom wall 12 and/or to a portion of the side wall 14, particularly where the latter is contiguous with the wall 12, the surface coating 24 if initially applied in sufficient thickness may, in some cases and/or for certain purposes of the composite article, be finished off and/or decorated in various ways. For example, coating 24 may be burnished or polished; coated with ceramic colors; treated with impregnants or effect agents; or monograms, designs, code number or other indicia may be etched or otherwise formed therein.

In accordance with a preferred embodiment of the invention the coating 24 is applied only in sufficient thickness to provide an adhering layer of oxygen-containing thermally conductive metal that functions as a base or substrate for the application of one or more other layers. For example, the coated cookware illustrated in FIG. 1 may be dipped in oxygen-free (substantially oxygen-free) molten metal such as molten copper, aluminum or an alloy thereof so as to provide a thicker coating of metal thereon that is substantially devoid of oxygen. Or, alternatively, there can be electrolytically deposited, in known manner, upon the coating 24 an overlayer of an electroplatable thermally conductive metal such as copper or its obvious equivalent.

The above-described dip-applied or electrolytically deposited coatings of the desired thickness that are superimposed upon coating 24 can then be finished off, if desired, as described above with reference to coating 24.

Reference is now made to FIG. 2 wherein corresponding elements (as also in FIG. 3) have been identified by the same numerals. This figure illustrates the spray-deposition of a second coating 30 over the first coating, and is a preferred method of applying an overlying coating.

Once a bond has been effected between the applied first coating and the crystalline ceramic substrate as described above with reference to FIG. 1, various techniques can be used to build up the thickness of the first coating.

The application of an adhering thermally conductive metal or metal-like coating to a crystalline ceramic substrate has posed many problems due to the constitution and physical properties including the low lineal coefficient of thermal expansion of such a ceramic material and the quite different physical properties of thermally conductive metals and the like. The problem of depositing an adhering coating on a crystalline ceramic substrate has been solved to a substantial extent by the procedure illustrated in FIG. 1 and previously described. Advantageously, however, and in order to provide a more commercially acceptable product, a thicker more uniform coating is desirable. This can be done, as hereinbefore indicated, by dip application of the initially coated article in molten thermally conductive metal or by electroplating an electroplatable thermally conductive metal, e.g., copper, upon the first coating. Such techniques have the disadvantage of being unduly costly since, for one reason, they do not lend themselves to a simple, production-line operation.

Surprisingly and unobviously it was discovered that the desired improvement in the first coating on the crystalline ceramic substrate can be obtained merely by spraying upon the first coating, in a non-oxidizing atmosphere, globules of molten thermally conductive substantially oxygen-free metallic material that adheres to the said first coating. This can be done most conveniently by providing the flame spray 32 with the shield 34 whereby secondary air is kept from the spray zone 36 and oxidation of, or dissolution of oxygen in, the globules of molten thermally conductive metal (numerous examples of which have been given hereinbefore) is prevented Hence there is deposited upon the first coating 24 a second coating 30 of the aforementioned oxygen-free metallic material. This second coating may be applied in any desired number of passes until a coating of a desired thickness has been obtained.

Adjustments can usually be made in the flame spray 32 so that the only oxygen present is that which is consumed by the flame. However, if desired or required, the operation can be further controlled to insure that a non-oxidizing atmosphere envelops the flame spray by introducing into the zone 36, through suitable openings (not shown) in the wall of the shield 34, any necessary amount of an inert gas such as nitrogen, argon, helium or the like.

In operation, the shaped crystalline ceramic container or vessel 10 is given an initial spray-deposited coating at one station as illustrated in FIG. 1, and then is moved to another station where an overlying coating is applied to the first coating as illustrated in FIG. 2. No intermittent cooling is required (or desirable) other than the slight cooling that may take place in moving the vessel 10 from one station to another. The time interval between stations, however, in all cases should be of such duration that the applied first coating has sufficiently solidified so that it does not drip or drain from the ceramic substrate.

FIG. 3 illustrates a composite article of the invention after removal of the shield 28 (FIGS. 1 and 2) will be understood, of course, by those skilled in the art that the article, more particularly crystalline ceramic (glass-ceramic) cookware having a surface with a composite thermally conductive coating thereon, is normally provided with a handle (not shown) for the convenience of the user of the cookware. For this purpose the shaped article is designed so that there is an area or section near its top whereby a handle may be removably or fixedly attached. In normal operations this handle is attached after the crystalline ceramic cookware has been surface-coated in accordance with this invention.

Shaped, crystalline, ceramic articles that may be used in making the composite articles of this invention are known in the prior art (see, for example, U.S. Pats. 2,960,801 and –802 dated Nov. 22, 1960). I prefer to use the crystalline ceramics that are produced as described in Smith copending application Ser. No. 352,958, filed Mar. 18, 1964, and in Babcock et al. copending application Ser. No. 386,693, filed July 31, 1964, both of which applications are assigned to the same assignee as the present invention, and the disclosures of both of which are by this cross-reference made a part of the disclosure of the instant application. Reference is also made to an article "Glass," Chemical and Engineering News, Nov. 16, 1964, pp. 80–96, especially pp. 89, 90 and 96, for additional information on "glass-ceramics" (crystalline ceramics), their properties and uses.

Among the aforementioned preferred crystalline ceramic articles are, for example, shaped, non-porous, at least partly crystalline ceramic receptacles or containers having a multitude of substantially homogeneously dispersed crystals, essentially all of which crystals are in their largest lineal dimension less than 25 microns across, said ceramic receptacle having been formed from a pre-formed glass receptacle by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<2.4 |
| $SnO_2$ | 0–1.7 |
| $P_2O_5$ | 0–3 |
| $BaO$ | 0–5 |
| $ZnO$ | 0–3 | where the total weight percent of

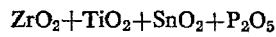

is at least 2.8, and the total weight percent $Li_2O+MgO$ is up to 10.5, more particularly from 6.3 to 10.5 said crystalline ceramic having an average lineal coefficient of thermal expansion less than $25 \times 10^{-7}/°$ C. over the range from zero to 300° C. and no more than 60% of the expansion coefficient of said glass before said in situ crystallization.

A more preferred glass composition (i.e., thermally crystallizable glass) is one consisting essentially of the following components, which are present in the following weight percentage ranges:

| | |
|---|---|
| $SiO_2$ | 68–72 |
| $Al_2O_3$ | 16–18 |
| $Li_2O$ | 2.8–3.8 |
| $MgO$ | 3–5 |
| $ZrO_2$ | 1.2–1.5 |
| $TiO_2$ | 1.2–<1.9 |
| $SnO_2$ | 0–1.5 |
| $P_2O_5$ | 0–2, preferably 0.5–2 |
| $BaO$ | 0–3 |

Such a glass composition also may contain, if desired, 1.9–<2.4 weight percent of $TiO_2$.

Other shaped crystalline ceramic containers embraced by the aforementioned preferred articles that are surface-treated in accordance with this invention are the crystalline ceramics (shaped in the form of a container or vessel) that are produced from other thermally crystallizable glass compositions by in situ crystallization as described in detail in the aforementioned copending applications Ser. No. 352,958 and Ser. No. 386,693.

In the above-described preferred shaped crystalline ceramic structures or containers used in carrying this invention into effect, it is believed that the crystalline ceramic material contains as predominant crystalline species lithium-containing crystalline phases, either as beta-eucryptite or beta-eucryptite-like crystals or as beta-spodumene or beta-spodumene-like crystals, or both, and that these lithium-containing crystalline phases are present in greater amount by volume than any other crystalline material which is present in the shaped crystalline body member.

Thus, the method of the invention, while it is valuable in its application to glass-ceramics in general, has its most important application to the coating of partially crystalline ceramics made by thermal in situ crystallization of a glass containing as essential components lithia, alumina and silica, together with sufficient nucleating agent to promote crystallization, thereby to yield a ceramic having an average lineal coefficient of thermal expansion, over the range from 0–300° C., less than $25 \times 10^{-7}/°$ C., more particularly less than $20 \times 10^{-7}/°$ C., and having, as predominant in situ-formed crystalline species lithium-containing crystals in the form of beta-eucryptite or beta-eucryptite-like crystals, or beta-spodumene or beta-spodumene-like crystals or both, said ceramics containing a multitude of such crystalline species in random orientation throughout said ceramic and dispersed in a glassy matrix remaining as a result of the in situ crystallization, and substantially all the crystals of said ceramic having a diameter of less than 25 microns.

In the compositions embraced by the foregoing description, a number of nucleating agents can be employed. For instance, $TiO_2$, $ZrO_2$, $SnO_2$, and $P_2O_5$, can be used alone or in combination with each other, where the total amount of one or more of such nucleating agents employed is between 2 and 10 weight percent of the total glass composition. Also, $Cr_2O_3$ can be used as a nucleating agent in amounts of about 0.2 weight percent or less, together with about 1–10 weight percent of any of the nucleating agents previously mentioned.

A particularly useful range of glasses and glass-ceramics within the scope of the foregoing description, and to which the present invention is applicable, are those containing 50–75 weight percent $SiO_2$, 16–35 weight percent $Al_2O_3$ and from 2.5–6 weight percent $Li_2O$, based on the total glass composition, as well as the amount of nucleating agent found to be necessary to promote the formation of the small crystals.

The terms beta-eucryptite crystals and beta-eucryptite-like crystals are herein used alternatively and in a generic sense. Thus, while beta-eucryptite is often thought of as the species crystal having one mole of lithium, one mole of aluminum and two moles of silicon, both terms are used in this application to designate crystalline species having the beta-eucryptite structure, as shown by X-ray diffraction, but the peaks can be shifted slightly depending upon whether there is a definite amount of silica present other than exactly two moles, either more or less silica than the two moles. Similarly, the terms beta-spodumene crystals and beta-spodumene-like crystals are herein used alternatively and in a generic sense, specifying crystalline species that have the crystalline structure of beta-spodumene that contains four moles of silica to one of alumina and one of lithia, but with the peaks shifted somewhat when the crystalline structure contains more or less than four moles of silica. Thus, as employed herein, the terms beta-eucryptite and beta-spodumene are each used in this generic sense.

A typical general procedure in making shaped crystallized ceramic articles prior to being surface-coated in accordance with this invention is outlined below:

(1) Melting and refining
(2) Glass conditioning and gob feeding
(3) Gob fed to mold
(4) Pressed
(5) Article cooled with blast of gaseous coolant
(6) Removed from mold
(7) Fire polished
(8) Annealed
(9) Nucleated and crystallized Additional information on most of the above steps is set forth in more detail in the aforementioned copending applications. After nucleation and crystallization (Step 9), the shaped crystallized ceramic containers may be cooled only to a chosen temperature within the aforementioned temperature range of 1200°–1600° F. at which the surface coating or coatings are applied as hereinbefore described with reference to FIGS. 1 and 2; or, they may be cooled to any desired lower temperature, and then reheated when it is desired to apply the surface-coating treatment involved in this invention.

The temperature profiles or gradients shown in FIGS. 4 through 7 have been briefly described hereinbefore. The test specimens comprised Cer-Vit® pressed glass-ceramic cookware in the form of two-quart sauce pans having a diameter of about 6 inches. (The Cer-Vit cookware used in these tests was made from one of the glass compositions and in the manner hereinbefore briefly described in the two paragraphs immediately following the paragraph in which reference was first made to copending applications Ser. Nos. 352,958 and 386,693, and more fully in the aforesaid copending applications.) After preheating to about 1600° F. the specimens to be coated were chucked on a rotating table with a spun serrated aluminum mask over the outside diameter of the specimen so that a pre-determined area could be sprayed.

The bottoms of the rotating pieces to be coated were sprayed as illustrated in FIG. 1 using a Metco spray gun into which was fed ⅛ inch aluminum wire. Five passes with the spray gun were made over the bottom of each piece in applying the aluminum coatings. The applied aluminum coatings had an average thickness of about 10 mils after the aforementioned five passes with the spray gun. The bottoms were polished, using a finely divided abradant, specifically an $Al_2O_3$-coated emery paper, until the surface had a smooth, even finish corresponding to that of the original cookware.

Uncoated and aluminum-coated test pieces were subjected to the medium heat of the heating elements of an electric stove. The temperature measurements indicated in FIGS. 4–7 were made with a contact pyrometer after heating for 2 minutes (FIGS. 4 and 6) or 5 minutes FIGS. 5 and 7). All temperatures are in ° F.

The difference between the highest and lowest temperatures recorded in each profile (disregarding the recorded edge temperatures) gives some indication of the effectiveness of the metal coated surfaces as compared with uncoated surfaces. In FIGS. 4 and 5 (plain bottom) this difference is 140° (FIG. 4) after 2 minutes' heating and 100° (FIG. 5) after 5 minutes' heating. In FIGS. 6 and 7 (aluminum-coated bottom), the corresponding differences are 60° (FIG. 6) and 80° (FIG. 7).

Instead of using aluminum wire as described above to produce an aluminum coating, one may similarly employ a copper or copper alloy wire to produce a copper or copper alloy coating on the crystalline ceramic substrate.

The above-described procedure in the application of, for example, copper or aluminum coatings is then repeated as illustrated in FIG. 2 and hereinbefore described, whereby metallic coatings, specifically copper and aluminum coatings, of improved thermal conductivity and other improved properties are obtained.

As will be evident to those skilled in the art, modifications of this invention can be made or followed in the light of the foregoing disclosure without departing from the spirit and scope of the disclosure or from the scope of the claims.

What is claimed is:

1. A shaped glass ceramic cookware container having a thermally conductive composite coating adhering to at least those surfaces thereof that are brought into direct contact with a source of heat during use of said container, said composite coating distributing said heat substantially uniformly throughout said cookware container, said container being a non-porous glass ceramic receptacle having a multitude of substantially homogeneously dispersed crystals, essentially all of which crystals are in their largest lineal dimension less than 25 microns across, said glass ceramic receptacle having been formed from a pre-formed glass receptacle by thermal in situ crystallization, said glass being a thermally crystallizable glass having a liquidus temperature below 2460° F., said composite coating comprising:

(A) a first coating comprising a thermally conductive oxygen-containing metallic material that has been spray-deposited on said surfaces from molten globules after the shaped container has been removed from the mold in which it was shaped and passed through annealing- and other heat-treatments prior to the application of the said coating; and (B) at least a second coating superimposed upon said first coating, the second coating being deposited as a substantially oxygen-free thermally conductive metallic material that is compatible with and therefore adheres to the said first coating.

2. A shaped, non-porous, glass ceramic ovenware receptacle for on-the-top-of-the-stove cooking, said receptacle having a bottom with a surface that is brought into direct contact with a source of heat during use, said receptacle having a side wall extending upwardly from the bottom to form a container for holding food, said glass ceramic receptacle having a multitude of substantially homogeneously dispersed crystals, essentially all of which crystals are in their largest lineal dimension less than 25 microns across, said glass ceramic receptacle having been formed from a pre-formed glass receptacle by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 | where the total weight percent of $$ZrO_2 + TiO_2 + SnO_2 + P_2O_5$$

is at least 2.8, and the total weight percent $Li_2O + MgO$ is 6.3 to 10.5, said crystalline ceramic having an average lineal coefficient of thermal expansion less than $25 \times 10^{-7}/°C.$ over the range from zero to 300° C., and no more than 60% of the expansion coefficient of glass before said in situ crystallization, said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:

(A) a first coating comprising a thermally conductive oxygen-containing metallic material that has been spray-deposited on said surfaces from molten globules after the shaped container has been removed from the mold in which it was shaped and passed through annealing- and other heat-treatments prior to the application of the said coating; and (B) at least a second coating superimposed upon said first coating, the second coating being deposited as a substantially oxygen-free thermally conductive metallic material that is compatible with and therefore adheres to the said first coating.

3. A shaped, non-porous, glass ceramic ovenware receptacle for on-the-top-of-the-stove cooking, said receptacle having a bottom with a surface that is brought into direct contact with a source of heat during use, said receptacle having a side wall extending upwardly from the bottom to form a container for holding food, said glass ceramic receptacle having a multitude of substantially homogeneously dispersed crystals, essentially all of which crystals are in their largest lineal dimension less than 25 microns across, said glass ceramic receptacle having been formed from a pre-formed glass receptacle by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2 + TiO_2 + SnO_2 + P_2O_5$$

is at least 2.8, and the total weight percent $Li_2O + MgO$ is 6.3 to 10.5, said crystalline ceramic having an average lineal coefficient of thermal expansion less than $25 \times 10^{-7}/°C.$ over the range from zero to 300° C., and no more than 60% of the expansion coefficient of glass before said in situ crystallization, said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:

(A) a first coating comprising a thermally conductive oxygen-containing metallic material which is copper and a copper oxide that has been spray-deposited on said surfaces from molten globules after the shaped container has been removed from the mold in which it was shaped and passed through annealing- and other heat-treatments prior to the application of the said coating; and (B) at least a second coating selected from the group consisting of copper and alloys of copper superimposed upon said first coating, the second coating being deposited as a substantially oxygen-free thermally conductive metallic material that is compatible with and therefore adheres to the said first coating.

4. A shaped, non-porous, glass ceramic ovenware receptacle for on-the-top-of-the-stove cooking, said receptacle having a bottom with a surface that is brought into direct contact with a source of heat during use, said receptacle having a side wall extending upwardly from the bottom to form a container for holding food, said glass ceramic receptacle having a multitude of substantially homogeneously dispersed crystals, essentially all of which crystals are in their largest lineal dimension less than 25 microns across, said glass ceramic receptacle having been formed from a pre-formed glass receptacle by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2 + TiO_2 + SnO_2 + P_2O_5$$

is at least 2.8, and the total weight percent $Li_2O + MgO$ is 6.3 to 10.5, said crystalline ceramic having an average lineal coefficient of thermal expansion less than $25 \times 10^{-7}/°C.$ over the range from zero to 300° C., and no more than 60% of the expansion coefficient of glass before said in situ crystallization, said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:

(A) a first coating comprising a thermally conductive oxygen-containing metallic material which is aluminum and an oxide of aluminum that has been spray-deposited on said surfaces from molten globules after the shaped container has been removed from the mold in which it was shaped and passed through annealing- and other heat-treatments prior to the application of the said coating; and (B) at least a second coating selected from the group consisting of aluminum and alloys of aluminum superimposed upon said first coating, the second coating being deposited as a substantially oxygen-free thermally conductive metallic material that is compatible with and therefore adheres to the said first coating.

5. A shaped, non-porous, glass ceramic ovenware receptacle for on-the-top-of-the-above cooking, said receptacle having a bottom with a surface that is brought into direct contact with a source of heat during use, said receptacle having a side wall extending upwardly from the bottom to form a container for holding food, said glass ceramic receptacle having a multitude of substantially homogenously dispersed crystals, essentially all of which crystals are in their largest lineal dimension less than 25 microns across, said glass ceramic receptacle having been formed from a pre-formed glass receptacle by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2 + TiO_2 + SnO_2 + P_2O_5$$

is at least 2.8, and the total weight percent $Li_2O + MgO$ is 6.3 to 10.5, said crystalline ceramic having an average lineal coefficient of thermal expansion less than $25 \times 10^{-7}/°$ C. over the range from zero to 300° C., and no more than 60% of the expansion coefficient of glass before said in situ crystallization, said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:
  (A) a first coating comprising a thermally conductive oxygen-containing metallic material which is copper, aluminum, alloys of copper and aluminum, and alloys of copper or aluminum and a member selected from the group consisting of zinc, magnesium, tin, nickel, manganese, gold, silver and mixtures thereof that has been spray deposited on said surfaces from molten globules after the shaped container has been removed from the mold in which it was shaped and passed through annealing and other heat treatments prior to the application of the coating; and
  (B) at least a second coating superimposed upon said first coating, said second coating being deposited as a substantially oxygen free thermally conductive metallic material which is compatible with and therefore adheres to the first coating and being copper, aluminum, alloys of copper and aluminum and alloys of copper or aluminum and a member selected from the group consisting of zinc, magnesium, tin, nickel, manganese, gold, silver and mixtures thereof.

6. A shaped, non-porous glass ceramic ovenware receptacle for on-the-top-of-the-above cooking, said receptacle having a bottom with the surface that is brought into direct contact with a source of heat during use, said receptacle having a side wall extending upwardly from the bottom to form a container for holding food, said glass ceramic receptacle having a multiplicity of substantially homogeneously dispersed crystals, essentially all of which crystals are in their largest lineal dimension, less than 25 microns across, said glass ceramic receptacle having been formed from a preformed glass receptacle by thermal in situ crystallization of a glass of the lithia-alumino-silicate system, said glass having a liquidus temperature below 2460° F.,
  said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:
    (A) a first coating comprising a thermally conductive oxygen-containing metallic material which is copper, aluminum, alloys of copper and aluminum, and alloys of copper or aluminum and a member selected from the group consisting of zinc, magnesium, tin, nickel, manganese, gold, silver and mixtures thereof that has been spray deposited on said surfaces from molten globules after the shaped container has been removed from the mold in which it was shaped and passed through annealing and other heat treatments prior to the application of the coating; and
    (B) at least a second coating superimposed upon said first coating, said second coating being deposited as a substantially oxygen free thermally conductive metallic material which is compatible with and therefore adheres to the first coating and being copper, aluminum, alloys of copper and aluminum and alloys of copper or aluminum and a member selected from the group consisting of zinc, magnesium, tin, nickel, manganese, gold, silver and mixtures thereof.

7. A shaped, non-porous, glass ceramic ovenware receptacle as defined in claim 6 wherein the metallic material of the second coating is the same as the metallic material in the first coating.

8. A shaped, non-porous glass ceramic ovenware receptacle for on-the-top-of-the-stove cooking, said receptacle having a bottom with the surface that is brought into direct contact with a source of heat during use, said receptacle having a side wall extending upwardly from the bottom to form a container for holding food, said glass ceramic receptacle having a multiplicity of substantially homogenously dispersed crystals, essentially all of which crystals are in their largest lineal dimension, less than 25 microns across, said glass ceramic receptacle having been formed from a preformed glass receptacle by thermal in situ crystallization of a glass wherein the glass comprises the following components, present in weight percent ranges:

| | Percent |
|---|---|
| $SiO_2$ | 50–70 |
| $Al_2O_3$ | 16–35 |
| $Li_2O$, | 2.5–6 | said glass having a liquidlus temperature below 2460° F.,
  said receptacle having a thermally conductive composite coating adhering to the bottom surface thereof which is brought into direct contact with a source of heat during use of said receptacle, said composite coating distributing said heat substantially uniformly throughout said cookware container, said composite coating comprising:
    (A) a first coating comprising a thermally conductive oxygen-containing metallic material which is copper, aluminum, alloys of copper and aluminum, and alloys of copper or aluminum and a member selected from the group consisting of zinc, magnesium, tin, nickel, manganese, gold, silver and mixtures thereof that has been spray deposited on said surfaces from molten globules after the shaped container has been removed from the mold in which it was shaped and passed through annealing and other heat treatments prior to the application of the coating; and
    (B) at least a second coating superimposed upon said first coating, said second coating being deposited as a substantially oxygen free thermally conductive metallic material which is compatible with and therefore adheres to the first coating and being copper, aluminum, alloys of copper and aluminum and alloys of copper or aluminum and a member selected from the group consisting of zinc, magnesium, tin, nickel, manganese, gold, silver and mixtures thereof.

References Cited

UNITED STATES PATENTS 2,053,923   9/1936   Stewart _____ 99—447

(Other references on following page)

UNITED STATES PATENTS

| | | |
|---|---|---|
| 2,780,561 | 2/1957 | Laforge. |
| 2,848,390 | 8/1958 | Whitehurst. |
| 3,020,182 | 2/1962 | Daniels. |
| 3,107,756 | 10/1963 | Gallet _____ 29—195 |
| 3,220,815 | 11/1965 | McMillan. |
| 3,380,818 | 4/1968 | Smith _____ 65—33 |
| 3,029,559 | 4/1962 | Treptow _____ 287—189 |
| 2,960,801 | 11/1960 | King _____ 65—33 |
| 3,006,775 | 10/1964 | Chen _____ 65—33 |
| 3,117,881 | 1/1964 | Henry _____ 65—33 |
| 3,313,609 | 4/1967 | Megles _____ 65—33 |

FOREIGN PATENTS 573,142   11/1945   Great Britain.

HYLAND BIZOT, Primary Examiner

U.S. Cl. X.R.

29—197, 199; 99—447